Nov. 28, 1939.  J. L. ADAMS, JR  2,181,445
METHOD AND APPARATUS FOR WELDING
Filed Aug. 7, 1928   3 Sheets-Sheet 1

INVENTOR
James L. Adams Jr.
by Byrnes, Stebbins & Parmelee
his attorneys

Patented Nov. 28, 1939

2,181,445

UNITED STATES PATENT OFFICE 2,181,445

METHOD AND APPARATUS FOR WELDING

James L. Adams, Jr., Youngstown, Ohio, assignor to The Youngstown Sheet & Tube Company, a corporation of Ohio Application August 7, 1928, Serial No. 297,962

58 Claims. (Cl. 219—6)

The present invention relates broadly to the art of welding, and more particularly to an improved method and apparatus for the continuous or intermittent welding of metallic shapes and articles.

It is customary in the art to which the present invention relates in the welding of relatively heavy-walled articles such as pipes, for example, to supply the current for heating the pipes to the welding temperature through contacts in engagement with different portions of the pipe surfaces. Due to the nature of these surfaces, as well as the movement of the pipe relative to the contacts, in the case of the continuous type of welder, there is a very appreciable as well as variable loss in the current supply during the welding operation. This necessarily results in different temperature conditions at different times and points, with a resulting irregularity or non-uniformity in the character of the weld. In addition to the objectionable results referred to, the usual contact-block type of resistance welding possesses the further disadvantage that due to the greater resistance in that path which includes the seam between the contacts, as compared with the back path through the pipe, a very large portion of the energy supplied is wasted in heating the back portion of the pipe, this quantity varying in accordance with the inverse diameter of the pipe being welded, so that the total energy losses here and at the contact-blocks, taken together, usually represent by far the greater portion of the total energy input.

The contact-current-input method of welding in the manufacture of pipes has been adapted both to intermittent welding operations and to continuous welding operations, but in the latter case it has been limited to pipes having a wall thickness not greatly in excess of $\frac{3}{32}$ inch. The difficulties of supplying sufficient energy via moving contacts to carry out the welding have limited the pipe thickness with which such contact method can be used in a continuous process, to about that indicated above.

It is one of the objects of the present invention to provide an improved method of welding by means of which the heating current is supplied inductively, thereby obviating the objections and difficulties heretofore encountered with respect to the use of such contacts as usually required in the resistance or the "flash" methods.

Another object of the present invention is to provide a method of welding adapted for continuous welding not only at higher rates of speed than have heretofore been feasible, but adapted to the welding of heavier sections than have heretofore been possible with the moving contact method. It has been found, for example, that the method in accordance with the present invention is adapted to the continuous welding of plates up to $\frac{3}{8}$ inches and more in thickness, at speeds of from 700 to 1000 feet an hour or over. In actual practice I have found that the method and apparatus herein disclosed may be operated, and the same have been operated, for the commercial welding of materials in excess of one-half inch in thickness at speeds in excess of 100 ft. per minute. It is my belief that the thickness of the material imposes no limitations on the applicability of the present invention to the welding thereof.

The present invention, although not limited to the so-called "flash" method of welding, is particularly adapted thereto. In the contact method of "flash" welding operations as heretofore carried out, it has been necessary for tremendous currents at low voltage to be fed into the work on one side of the seam and taken off on the opposite side through extremely heavy contact means applied under great pressure to the metal surfaces.

This contact method as heretofore carried out has further usually required the cleaning of said contact surfaces preparatory to welding, by suitable pickling or mechanical operations. In the use of such current-input contacts, not only do great energy losses occur at the junction points with the metal surfaces, in spite of such cleaning operations, but such contacts, due to variations of resistance, produce imperfect spots along the weld, of the character before referred to.

In many cases attempts have been made to substitute roll-contacts for the pressure contact-blocks. Although this substitution may be successfully made for products made up of relatively thin stock, for example up to $\frac{3}{32}$" or perhaps even $\frac{1}{8}$ inch in thickness, when an attempt is made to apply this method to the current supply for heavier stock, it has invariably proven wholly inadequate for two reasons; first, the required current values become entirely too great to handle through the double contacts required into and out of each of the rolls of the roller system; second, any roller gives substantially a line contact, so that little time is given under the roll for heating unless the speed of travel of the material is greatly reduced, with the consequent reduction of capacity of the apparatus. It has thus been found that the use of the roll defeats the attainment of a higher welding speed, and particularly with heavy stock. Where the heating is progressively accomplished by the use of a series of contact rolls spaced lengthwise of the stock being welded, there are intermediate intervals of cooling off between successive rolls, with a resulting low heating up efficiency along the seam to be welded.

Since each roller provides only a line contact, whereas the abstraction of heat is a continuous process, it is apparent that regardless of the number of contact rolls provided, it is only possible to adapt the method to stock below a certain thickness. In accordance with the present invention, the use of pressure contact blocks, heavy current carrying rollers, and the like, is entirely obviated, the current being developed entirely by means of electro-magnetic induction from a transformer, of which the continuously moving body being welded forms, in effect, the secondary element.

In the accompanying drawings I have shown for purposes of illustration only, a preferred embodiment of the present invention, it being understood that the drawings do not define the limits of my invention inasmuch as changes in the construction, arrangement, disposition and relative location and size of the various parts may be made without departing either from the spirit of the invention or the scope of my broader claims.

In carrying out the present invention, there may be provided a welding apparatus comprising a base 2, of any desired construction, having supported thereon roll stands 3, 4 and 5, which are hereinafter designated: first closing roll stand, flash regulating roll stand, and final closing or welding roll stand, respectively.

Carried by the first closing roll stand 3 is a series of rolls 6, mounted on angularly extending shafts 7, supported in suitable bearings 8 in the roll housing and cooperating with a bottom roll 9, suitably secured to a shaft 10, extending transversely of the housing. The opposite sides of the housing are so constructed as to occupy spaced relationship at their upper ends, as clearly shown in Figure 2, and are adapted to be adjusted toward or away from each other by means of an adjusting screw 11, effective for slightly changing the diameter of the roll pass formed by the rolls.

The rolls and the housing, as well as the bearings for the rolls, are of such construction as to provide a continuously open space 12 from the center of the roll pass through the upper end of the housing to the plane of the adjusting means 11, for the purposes hereinafter more fully pointed out.

The shaft 10 may be mounted in vertically adjustable bearings 13, carried by adjusting screws 14, by means of which they can be raised or lowered as may be desired in order to provide a roll pass of exactly the dimensions required, the screws being locked in adjusted position by means of nuts 15.

For driving the shaft 10, it may be provided on one end thereof with a bevel gear 16, meshing with a similar gear 17, on a shaft 18, extending lengthwise of the apparatus and driven by a motor 19 through a suitable system of reduction gearing 20. The motor may be of any desired type of construction, but is preferably of the variable speed type, adapted to have its speed controlled by a suitable regulating means 21. For driving the rollers 6, they may be formed with integral gear teeth 22, adapted to mesh with integral gear teeth 23, on the bottom roller 9, as clearly apparent from Figure 2 of the drawings.

The rollers 6 and 9 will initially be so set with respect to the diameter of the pipe P being welded as to bring the spaced edges 24 thereof into contact as the pipe passes between the rollers.

The roll stand 4 is provided with a pair of similar housings 25, each of which carries a substantially vertically extending pin 26, on which pins are journaled rollers 27 to act on substantially diametrically opposite sides of the pipe. The housings are indicated as being carried on suitable pivotal mountings 28, at their lower ends, and as cooperating at their upper ends with the adjusting means 29, similar to the adjusting means 11 before described.

It will be apparent to those skilled in the art that instead of pivotally mounting the housing sections, they may be constructed similarly to the roll stand 3 for adjustment by springing thereof to the extent required to properly adjust the rollers 27. These rollers will be so set with respect to the diameter of the pipe being welded as to permit the edges 24, closed during passage through the roll pass of the roll stand 3, to slightly open, as clearly indicated in Figure 3, for the purposes hereinafter pointed out in detail.

The final closing or welding roll stand 5 is conveniently of a construction generally similar to that of the first closing roll stand and parts corresponding to those already described in connection therewith are designated by the same reference characters having a prime (') affixed thereto.

Figure 1:
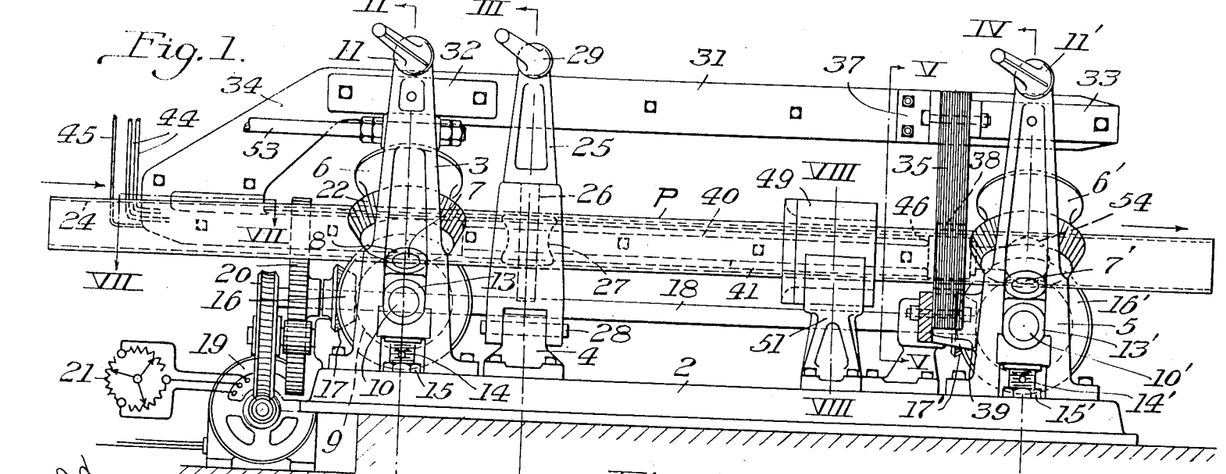
Figure 1 is a side elevational view of one form of apparatus by means of which the present invention may be practiced.
Figures 2, 3, 4, 12:
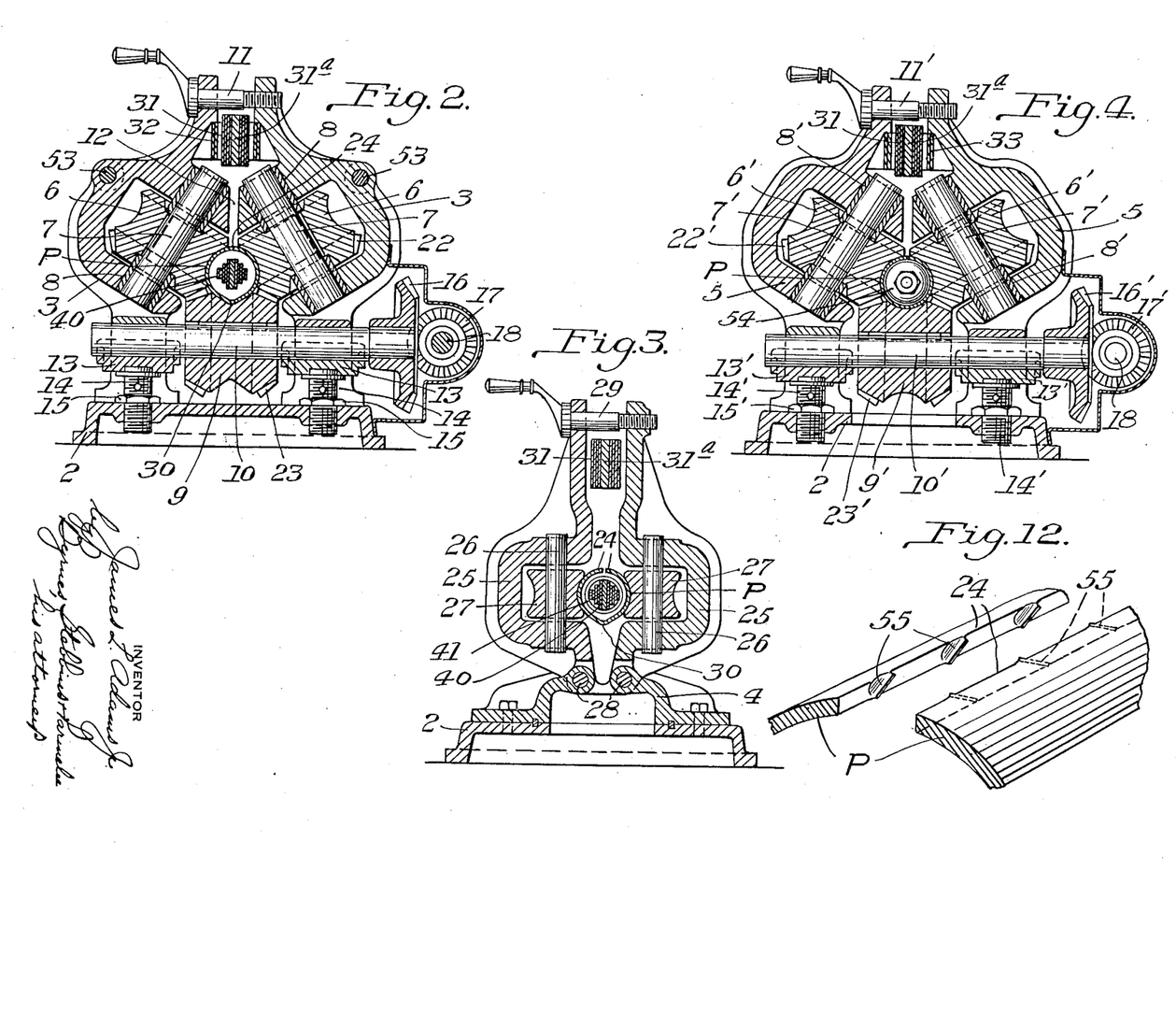
Figure 2 is a vertical transverse sectional view on the line II—II of Figure 1, looking in the direction of the arrows.
Figure 3 is a transverse sectional view on the line III—III of Figure 1, looking in the direction of the arrows.
Figure 4 is a transverse sectional view on the line IV—IV of Figure 1, looking in the direction of the arrows.
Figure 12 is a perspective view, broken away, and illustrating a slightly modified embodiment of the invention.

The pipe sections as prepared for delivery to the welding apparatus will preferably be of a cross sectional shape, generally similar to that illustrated in Figure 2 of the drawings, providing a hump 30 substantially diametrically opposite the plane of the meeting edges 24. The pipe, closed during its passage between the rolls of the first closing roll stand, will tend to spring open as the pressure of these rolls is released, the extent of opening being controlled by the rollers 27 of the flash regulating roll stand. Thus, during passage through the first closing roll stand, the edges will be brought into contact and this contact will be subsequently broken to the extent permitted by the initial setting of the flash regulating rollers.

The energy input to the seam being welded will be determined by the amount of space between the edges 24, as determined by the flash regulating rollers, and while it is desirable to increase this energy as much as possible within the capacity of the apparatus, the space if made too great will result in breaking of the flash. If desired, in place of the hand regulating means 29 herein illustrated, I may provide automatic adjusting means responsive to the energy input in such manner that the flash regulating rollers will be automatically adjusted to maintain this input within predetermined limits. But such modification represents a development of the present invention, and not one of its essential elements, and so is not shown on the drawings, or introduced into the claims.

It will also be apparent that while I have for simplicity herein illustrated but a single stand of rollers for regulating such flash, the number of stands may be increased at will and the individual stands spaced at desired points throughout the length of the apparatus.

Extending between the two component halves of the roll stands 3 and 5, and insulated therefrom in any desired manner, is a laminated magnetic yoke 31. If desired, this yoke may be stiffened by a central solid bar 31ª, although such a construction is not essential. The yoke 31 may be secured to the first closing roll stand by means of spring plates 32 or other equivalent means permitting the roll stands to be adjusted slightly in the manner described without disturbing the supporting relationship with respect to the yoke. Similar means 33 may be utilized for supporting the yoke adjacent the final closing or welding roll stand 5. The construction must, however, be such as to maintain the yoke in predetermined relationship to the roll stand, and particularly in predetermined relationship to the axis of the pipe being welded.

Figure 7:
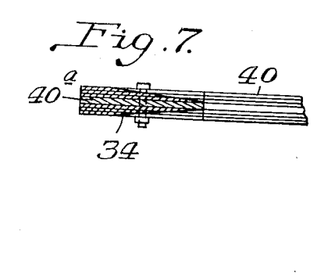
Figure 7 is a horizontal sectional view along the line VII—VII of Figure 1, looking in the direction of the arrows.

Adjacent the entering end of the apparatus, the yoke 31 is formed with a downwardly projecting portion 34, which on the line VII—VII only, is preferably of generally narrow wedge-shaped cross-sectional area, as indicated in Figure 7 of the drawings, the taper of the sides being such as to permit the edges 24 of the pipe in passing close thereto to gradually move into adjacent relationship under the influence of the first closing roll stand 3.

Figure 5:
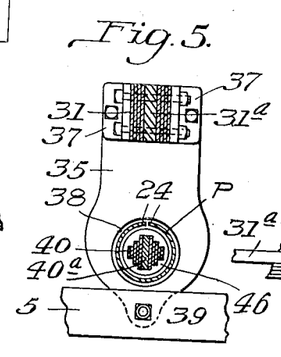
Figure 5 is a detail sectional view, on an enlarged scale, on the line V—V of Figure 1, looking in the direction of the arrows.
Figure 6:
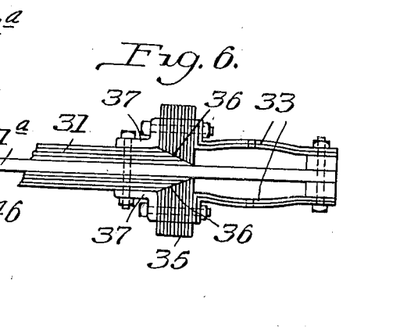
Figure 6 is a top plan view of a portion of the apparatus illustrated in Figure 1.

Adjacent its opposite end, the yoke 31 carries a downwardly projecting laminated magnetic pole-piece 35 of the construction illustrated more particularly in Figure 5 of the drawings, and preferably joined to the yoke along angularly extending lines 36, as indicated in detail in Figure 6, although other types of joints may be utilized. The yoke and pole-piece may conveniently be held in cooperative relationship by means of angle brackets 37 on opposite sides of the yoke.

At its lower end, the pole piece 35 is formed with an opening 38, somewhat chamfered off on its entering side, and of slightly greater diameter than the exterior diameter of the pipe being welded, to permit the same to pass freely therethrough. At its extreme lower end the pole piece 35 may be secured to the roll stand 5 by any suitable non-magnetic cross-bar or other means 39.

Figure 8:
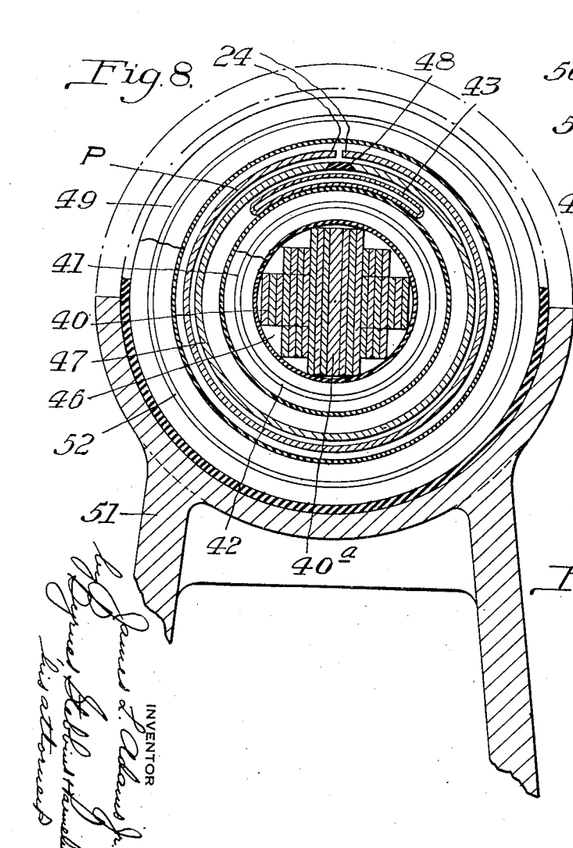
Figure 8 is a vertical transverse sectional view, on an enlarged scale, along the line VIII—VIII of Figure 1.
Figure 9:
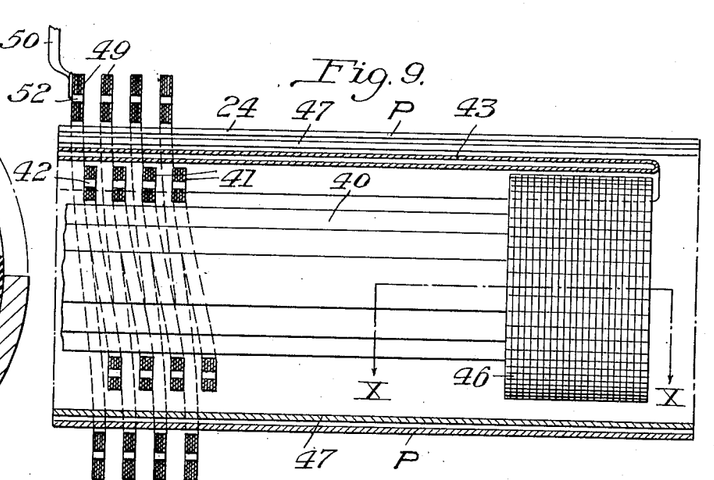
Figure 9 is a partial longitudinal sectional view, on an enlarged scale, through the pipe being welded.
Figure 11:
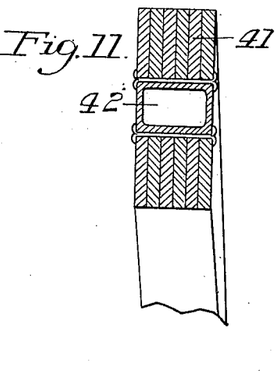
Figure 11 is an enlarged sectional detail of the coil 41.

Extending continuously between the downwardly projecting portion 34 and the pole piece 35 is a central magnetic core 40, of such dimensions as to permit the free passage thereover of the pipe 30 being welded. This core is preferably of laminated silicon steel construction with a $\frac{1}{16}''$ thick or so solid bar center 40ª, and is provided around a portion of its length with a coil 41, as illustrated in detail in Figures 8, 9 and 11. This coil may have incorporated therein cooling means 42, either centrally, or along its outer edge only, and of any desired construction.

There may or may not also be provided intermediate the coil 41 and the pipe P a non-magnetic cooling jacket 43. Cooling fluid may be supplied to the cooling means 42 and the jacket 43 through suitably insulated inlet and outlet connections 44 extending outwardly from the interior of the pipe through the space between the edges 24 and at left end of downwardly projecting portion 34. Current to the coil 41 may be supplied thereto through suitable means 45. Proper coil insulation is to be provided as required.

Figure 10:
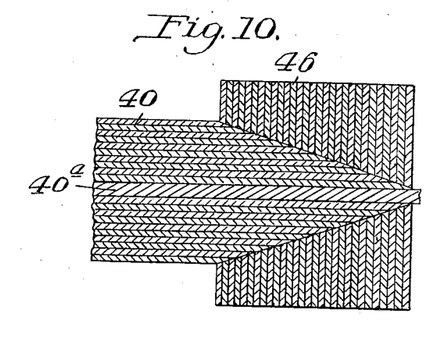
Figure 10 is a detail sectional view along the line XX of Figure 9.

Adjacent the final closing or welding roll stand 5 the core 40 is provided with a circular pole piece 46, the magnetic joint between which and its core is preferably made of generally V-shape, as indicated in Figure 10, so as to permit the desired change in the direction of flux, as understood in the art.

Surrounding the cooling jacket 43, the coil 41, the pole piece 46, and the core 40, may be a guide 47 conveniently in the form of a length of non-magnetic pipe of C-shape cross section, having the opening 48 between its edges preferably in alignment with the space between the edges 24 of the pipe being welded. This space, in actual practice, may or may not be filled with suitable heat-resisting insulating material as mica, adapted to be replaceable at will, and serving to protect the inner assembly from any particles of heated metal which may be thrown off from the pipe during the heating operation.

In addition to the inner primary coil 41, I may provide one or more supplemental exterior regulating coils 49, fed in turn through heavy leads 50. Where such exterior regulating coils are provided, they may be supported on suitable brackets 51, it being apparent that they are insulated therefrom in any desired manner.

Such coils are also preferably of such nature as to be adjustable axially of the pipe being welded, whereby the heating up voltages along different portions of the seam may be accurately controlled, it being remembered that under the coil conditions existing, the working voltages along the seam at any point can be lowered by shifting the primary coil or coils away from that location, and vice versa. In the flash welding process, the voltage across the seam should usually be much higher during the flash period than during the first initial contact interval established by the first closing roll stand 3, and the coil disposition indicated gives a convenient means for governing this factor. In this connection it is to be noted that while the electrical and magnetic conditions met with indicate that the internal, or the sub-divided, primary coil is the best, it is prefectly possible to provide a welding apparatus in which the entire winding has a position exterior to the pipe being welded, and such a construction is frequently required when the pipe being welded is of such small diameter as to not provide sufficient space for an internal coil-plus-core construction. For large pipe diameters, the requisite heating energy can easily be supplied at 60 cycles, but in the handling of smaller and smaller tubes, higher and higher frequencies are preferable, experience indicating that frequencies up to around 240 cycles per second or even higher give desirable results. This is because the smaller pipe diameters do not provide sufficient inside room for the required lower frequency core cross-sections necessary when heavy stock is to be handled at speeds of the character hereinbefore referred to.

I have also found that in many cases the combination of an external and internal primary winding each having approximately the same number of turns is desirable, inasmuch as the magnetic leakage effect of the one through the pipe is cancelled by the other. The pipe after having passed the inner pole piece 46 is at a temperature such that it may be effectively welded, and at this temperature it passes into the roll pass of the final closing or welding roll stand 5 wherein it is acted upon by the rollers 6' and 9', the dimensions of the pass being such that the heated edges 24 are brought into welding engagement and pressed together to some considerable extent. The contour of the bottom roller 9' is preferably such as to remove the hump 30 and develop a true circular outline in the pipe. It will be apparent to those skilled in the art that the metal constituting the hump when moved to its new position under the influence of the bottom roller 9' tends, upon leaving the roll pass, to resume its original shape. This has the effect of holding the newly welded edges in tighter engagement, thereby obviating possibility of tearing such edges apart.

Instead of utilizing a contour of the character referred to, including the hump 30, I may adapt my apparatus to the handling of truly circular shapes by providing a series of holding rollers adapted to cooperate with the welded pipe and prevent separation of the edges during the cooling thereof.

In the use of apparatus of the character herein described, it will be apparent that the pipe being welded may be considered as the movable secondary of a transformer system in which the coil or coils provided constitute the primary.

As the edges of the pipe are brought together in the first closing roll stand, a short-circuit results, starting up the heating operation. Thereafter, the edges are slightly separated to the extent permitted by the flash regulating roll stand or stands, thereby initiating the so-called "flash" process of heating, which is maintained and regulated at will as the pipe secondary passes through the successive flash regulating roll stands provided. This slight separation immediately leads to a greater voltage across the seam and consequently a much greater energy input to the latter than would be the case for plain resistance welding. In this flash welding process, as the seam lips become separated after the first initial metal-to-metal contact provided in the first closing roll stand, the voltage across the gap immediately rises to a much larger fraction of the total generated in the one turn of the transformer concerned, so that the gap takes a correspondingly greater fraction of the total energy put into that single turn, the I²R losses through the back path provided by the metal being but a minor fraction of the total energy input, so long as the pipe diameter involved is not over two or three feet. It will be apparent to those skilled in the art that all of the current going through the pipe secondary represents actual welding current, the potential drop across the gap acting as a controlling factor for the total current flow. In the old so-called contact-block type of resistance welding, the current flow through the back path is not directly limited by the voltage across the seam, and the current in such back path may rise to tremendous values, all such values representing a total loss.

From the foregoing, the reason for constructing the roll stands in such manner as to provide a continuously open space between the opposite sides thereof from the surface of the pipe being welded to a point at least above the plane of the return yoke 31, will be apparent. The water jacket 43 does not constitute a continuously closed conducting path and the guide-pipe or table 47 is provided with a space between its adjacent edges, thereby insuring a condition in which there are no great current losses through any paths other than the path formed by the pipe secondary itself. To this same end the supporting means 39 for the pole piece 35, and the bracket or brackets 51 for the outer coil or coils 49, will be of non-magnetic material, and all of the parts will be suitably insulated one from the other to prevent extraneous losses in the apparatus.

It will be apparent further to those skilled in the art that while I have herein illustrated and described the invention as particularly applicable to the continuous heating of pipes, that its utility is not limited with respect thereto. It is equally adaptable, as to the principle involved, to the continuous or intermittent welding of many desired shapes, or articles. It will also be apparent to those skilled in the art that in utilizing the invention for the formation of tubes of relatively large diameters, a plurality of parallel sheets or strips may be utilized, each occupying its own fraction of the total pipe perimeter. It is not uncommon practice at the present time to construct large pipes of two or more individual strips or sheets, and with evident, but not essential modifications, my invention can be adapted readily to the simultaneous, or successive welding of the two seams involved.

All of the primary coils are herein illustrated as being edgewise strap wound. While such a construction is desirable, it is not imperative that this system of winding be utilized. Each of the coils is, however, preferably provided with cooling means, the inner coil being shown as including an integral cooling pipe 42, while the outer coil includes a similar cooling pipe 52, through which cooling water or oil may be passed in any desired manner from insulated terminal ducts.

While the apparatus has herein been described as a complete unit, the construction is such that it is adapted to be utilized in series with a forming machine by means of which the sheet material is bent to the desired form for delivery to the welding apparatus. The roll stand construction herein disclosed may provide convenient means, for example, for the attachment of braces, or tie rods 53, adapted to lead to such a forming machine, one of which is disclosed in my copending application Serial No. 297,963 filed of even date herewith (now Patent No. 1,942,466, dated Jan. 9, 1934).

If desired, there may be provided for cooperation with the final closing or welding roll stand, an inside ring or plug 54 preferably of high-speed or hardened steel construction, or of other special construction, having an outside diameter such as to form the desired inside diameter in the pipe as it passes through the welding pass, and mounted by any suitable means on end of core 40 and pole-piece 46.

In Figure 12 of the drawings there is illustrated a slightly modified construction with respect to the original characteristics of the sheet or strip used to form the tube. I believe that the flash process may be initiated with more speed, uniformity and certainty if slightly projecting and angularly intersecting thin ridges, such as indicated at 55, are nipped at regular short intervals along the edges 24 of the plate P before the latter reaches the first closing roll stand 3. If these respective ridges lie at about equal but opposing angles to the wide faces of the plate when the latter lies flat, they will intersect and give the desired small area contact when the plate is folded up to tubular shape. A small area of initial metal contact is necessary if the flash is to be initiated quickly, as in the case of high speed welding. The thin ridges are easily crushed back to give certainty to the successive equally spaced contact positions, not otherwise readily obtained. The invention, therefore, although not limited to the performing of projections or other contacting portions on the metal, does contemplate the advantages of such an operation, particularly when high operating speeds are attempted.

It will likewise be apparent that while I have described the invention particularly in connection with the so-called flash system of welding, that it is equally adaptable to the plain-resistance processes in which the edges to be welded are maintained in contact throughout the entire heating period, and likewise to heating generally, the invention in such cases possessing the advantages of complete elimination of current-input contact members of the character hereinbefore mentioned.

Other changes in the construction of the apparatus and in the manner of utilizing the same will readily suggest themselves to those skilled in the art, and such changes may be made without departing from the advantages obtained by the use of a method and apparatus in accordance with the general principle described herein and set forth in the appended claims.

I claim:

1. In the method of electric welding, the steps comprising inducing a heating current flow in the material to be welded transversely of and across the edges of the material, effecting bodily forward movement of the material during the pre-welding heating up operation, controlling the position of the edge portions of the material and progressively moving the edge portions during said pre-welding heating up operation in a direction substantially parallel to said current flow to vary the amount of spacing therebetween, and applying sufficient pressure to the material to weld the same.

2. In the method of electric welding, the steps comprising inducing a heating current flow in the material to be welded transversely of and across the edges of the material, effecting bodily forward movement of the material during the prewelding heating up operation, continuously controlling the position of the edge portions of the material during said bodily forward movement and progressively moving the edge portions during said pre-welding heating up operation in a direction substantially parallel to said current flow to progressively vary the amount of spacing therebetween, maintaining said edge portions sufficiently close while so spaced as to insure the maintenance of a flash therebetween, and applying sufficient pressure to the material to weld the same.

3. In the method of electric welding, the steps comprising inducing a heating current flow in the material to be welded transversely of and across the edges of the material, effecting bodily forward movement of the material during the pre-welding heating up operation, continuously controlling the position of the edge portions of the material and progressively moving the edge portions during said pre-welding heating up operation toward each other in a direction substantially parallel to said current flow to progressively decrease the amount of spacing therebetween, and applying sufficient pressure to the material to weld the same.

4. In the method of electric welding, the steps comprising inducing a heating current flow in the material to be welded transversely of and across the edges of the material, effecting bodily forward movement of the material during the pre-welding heating up operation, controlling the position of the edge portions of the material and holding the same in such spaced relationship as to insure the maintenance of a flash therebetween, and applying sufficient pressure to the material to weld the same.

5. In the method of electric welding, the steps comprising inducing a heating current flow in the material to be welded transversely of and across the edges of the material, effecting bodily forward movement of the material during the pre-welding heating up operation, bringing successive edge portions of the material into contact at the commencement of the heating operation by movement in a direction substantially parallel to said current flow, thereafter maintaining such edges in predetermined spaced relationship to provide a flash heating zone, and finally bringing such edges into intimate welding engagement.

6. In the method of electric welding, the steps comprising inducing a heating current flow in successive longitudinal portions of the material to be welded with the current flow transversely of and across the edges of the material, effecting bodily forward movement of the material to effect a pre-welding heating up operation on successive longitudinal portions thereof, bringing successive edge portions of the material into contact at the commencement of the heating up operation, thereafter maintaining such portions in predetermined spaced relationship to provide a flash heating zone, and finally bringing such portions into intimate welding engagement.

7. In the method of electric welding, the steps comprising inducing a heating current flow in the material to be welded transversely of and across the edges of the material from edge to edge, effecting bodily forward movement of the material during the pre-welding heating up operation to insure production of such a current flow in successive longitudinal portions of the material, first maintaining the edges of one such portion in spaced relationship to effect a flash heating operation, and thereafter bringing the edges of such portion into contact to effect a resistance heating operation, and applying pressure to such successive portions to weld the same.

8. In the method of electric welding, the steps comprising inducing a heating current flow in successive longitudinal portions of the material to be welded which flow is transversely of and across the edges of the material from edge to edge, effecting bodily forward movement of the material, causing such edges during such forward movement to assume a spaced relationship for the production of a flash heating zone and a contacting relationship for the production of a resistance heating zone, and applying pressure to the heated portions to weld the same.

9. In the method of electrically welding tubing, the steps comprising passing an unwelded seam tube through a magnetic field in a direction substantially parallel to the longitudinal axis of the tube and perpendicular to the lines of force of the field, periodically varying such field to induce an electric current flow in the tube circumferentially thereof, maintaining the edges of a portion of the tube in which the circumferential current flow is induced so separated as to create a flash zone of appreciable length for heating the edges preparatory to completing the weld, and then completing such weld.

10. In the method of electrically welding tubing, the steps comprising passing an unwelded seam tube through a magnetic field in a direction substantially parallel to the longitudinal axis of the tube and perpendicular to the lines of force of the field, periodically varying such field to induce an electric current flow in the tube circumferentially thereof, maintaining the edges of a portion of the tube in which the circumferential current flow is induced so separated as to create a flash zone of appreciable length, and subsequently bringing said edges together under a welding pressure.

11. In the method of electrically welding tubing, the steps comprising passing an unwelded seam tube through a magnetic field in a direction substantially parallel to the longitudinal axis of the tube and perpendicular to the lines of force of the field, periodically varying such field to induce an electric current flow in the tube circumferentially thereof, maintaining the edges of a portion of the tube in which the circumferential current flow is induced so separated as to create a flash zone of appreciable length for heating the edges preparatory to completing the weld, maintaining the flash zone in space as the tube moves through said magnetic field and the completing such weld.

12. In the method of electrically welding tubing, the steps comprising passing an unwelded seam tube through a plurality of overlapping substantially coincident cumulatively co-acting magnetizing forces including a magnetic field, and in a direction substantially parallel to the longitudinal axis of the tube and perpendicular to the lines of force of the field, periodically varying such field to induce an electric current flow in the tube circumferentially thereof, maintaining the edges of a portion of the tube in which the circumferential current flow is induced so separated as to create a flash zone of appreciable length, and subsequently bringing said edges together and welding the same.

13. In the method of electrically welding tubing, the steps comprising inducing an electric current flow in the tubing circumferentially thereof and from one edge to the other edge, maintaining the edges of the tubing in closely spaced relationship to effect and maintain a flash for a heating operation thereon, continuously axially advancing said tubing while maintaining the flash heating zone substantially fixed in space, and bringing the edges together and welding the same.

14. In the method of electric welding, the steps comprising inducing a cross seam current flow in an unwelded seam tube, maintaining the edges of a portion of the seam in abutting relationship, maintaining the edges of another portion of the seam closely spaced to establish a flash zone by said current flow effective for heating said edges to substantially a welding temperature, moving said tube while maintaining said flash zone substantially fixed in space, and then bringing the edges at a welding temperature into abutting relationship and completing the weld.

15. In an electric welder, a stationary inducing coil having a core, means for continuously advancing an unwelded seam tube over said coil and core, and means for maintaining the edges of progressive portions of said tube in spaced relationship of the order required to establish a flash heating zone.

16. In the method of electric welding tubing, the steps comprising progressing an unwelded seam tube axially through a magnetic field in a direction substantially parallel to the longitudinal axis of the tube and perpendicular to the lines of force of the field to induce a cross seam electric current flow in the tube circumferentially thereof, and modifying the resistance to current flow progressively in successive conductive paths across the seam of said tube by changing the spacing of the edge portions thereof while maintaining such edge portions in spaced relationship of the order required to establish a flash zone.

17. In the method of electric welding, the steps comprising continuously advancing an unwelded seam tube, continuously supplying a cross seam current to said tube throughout a predetermined zone thereof, and maintaining the edges in such zone so spaced as to insure a flash therebetween.

18. In the method of electric welding, the steps comprising continuously advancing an unwelded seam tube, continuously supplying a cross seam current to said tube throughout a predetermined zone thereof, maintaining the edges in such zone so spaced as to insure a flash therebetween, and subsequently bringing said edges together under welding pressure.

19. In the method of electric welding, the steps comprising supplying a heating current to an unwelded seam tube, bringing successive edge portions of said tube into contact at the commencement of the heating operation, thereafter maintaining such portions in predetermined spaced relationship to provide a flash heating zone, and finally bringing such portions into intimate welding engagement.

20. In an electric welder, an inductor comprising divisions in substantially concentric relationship and effective within substantially a common zone, said divisions being spaced in a direction radially thereof to permit the passage therebetween of material to be welded, means for supporting an open seam tube to be welded in inductive relation to and radially between the divisions of said inductor, and means for advancing the tube along its axis and through such space while maintaining such inductive relation, said divisions being effective to approximately cancel at least a portion of the magnetic leakage flux otherwise present through such material.

21. In the continuous method of electric induction welding, the steps comprising inducing a flash heating voltage and current across a seam between metal edge faces, progressively bringing said faces into contact, maintaining a resistance heating current for a desired interval after such contact, continuously moving said edge faces, co-ordinating the speed of travel of said faces with the energy input to insure bringing said faces to a welding temperature, and applying sufficient pressure to the edge faces when so heated to make the weld.

22. In the continuous method of electric induction welding, the steps comprising inducing a flash heating voltage and current across a seam between alined metal edge faces, progressively bringing said faces into contact, maintaining a resistance heating current for a desired interval after such contact, continuously moving said edge faces, co-ordinating the speed of travel of said faces with the energy input to insure bringing said faces to a welding temperature, and applying sufficient pressure to the edge faces when so heated to make the weld.

23. In the continuous method of electric induction welding, the steps comprising continuously and steadily progressing spaced metal elements, continuously moving said elements one toward the other to provide a narrow and continuously converging seam therebetween, inducing a flash heating current across said seam, bringing said elements into contact, continuing the heating of said elements while in contact, and then welding the same.

24. In the continuous method of electric induction welding, the steps comprising longitudinally advancing metal parts, maintaining a narrow and slowly converging seam between said parts inducing a flash heating current across said seam and controlling the seam width and the flash position.

25. In the continuous method of electric induction welding, the steps comprising longitudinally advancing metal parts, maintaining a narrow and slowly converging seam between said parts, inducing a flash heating current across said seam, controlling the seam width and the flash position with respect to the zone in which said heating current is induced in the metal parts, bringing the metal parts into contact, and welding the same.

26. In the continuous method of electric induction welding, the steps comprising longitudinally advancing metal parts, maintaining a narrow and slowly converging seam between said parts, inducing a flash heating current across said seam, accurately regulating the seam width and the flash position, and effecting a resistance heating operation concomitantly with the flash heating operation and in a zone spaced therefrom.

27. In the continuous method of electric induction welding, the steps comprising longitudinally advancing metal parts, maintaining a narrow and slowly converging seam between said parts, inducing a flash heating current across said seam, controlling the seam width and the flash position with respect to the zone in which said heating current is induced in the metal parts, and effecting a resistance heating operation concomitantly with the flash heating operation in a zone spaced therefrom.

28. In the continuous method of electric induction welding, the steps comprising bringing progressive portions of previously spaced metal edges into contacting relationship, subsequently separating said progressive previously contacting portions and maintaining a minute alined gap therebetween, inducing a flash heating potential and current across said gap, and controlling the spacing of the progressing gap to control the flash heating between said edges.

29. In the continuous method of electric induction welding, the steps comprising bringing progressive portions of previously spaced metal edges into contacting relationship, subsequently separating said progressive previously contacting portions and maintaining a minute alined gap therebetween, inducing a flash heating potential and current across said gap, controlling the spacing of the progressing gap to control the flash heating between said edges, and subsequently bringing said edges again into contact and effecting a resistance heating operation therein.

30. In a continuous electric induction tube welder, means for continuously advancing a preformed tube blank having an open seam in a direction generally axially thereof, an inducing coil wound substantially transverse to the axis of said blank and consisting of an inner and an outer section disposed respectively on the inside and outside of a blank to be welded, said sections having parts thereof substantially in a common plane transverse to the axis of the blank, and means for variably controlling the width of the seam in said blank.

31. In the continuous method of electric induction welding, the steps comprising moving an open seam tube along its longitudinal axis to bring progressive portions thereof into a current inducing zone, effecting a periodically varying current flow in a path adjacent to but spaced from said tube in said zone and inducing thereby a cross seam current flow in the tube, bringing the seam edges progressively into closer and closer proximity during such movement until an electric flash heating zone is maintained by said induced current as said open seam tube travels forwardly, then bringing said seam edges progressively into actual metallic contact to produce an advancing resistance heating zone, and finally exerting pressure across the seam to consolidate the weld.

32. In the continuous method of electric induction welding, the steps comprising moving an open seam metal tube along its longitudinal axis to bring successive portions thereof into an inducing zone, effecting in said zone a periodically varying current flow adjacent to but spaced from a surface of said tube and inducing thereby a cross seam current flow in the tube, bringing the seam edges of the tube into closer and closer proximity until said induced current is able to maintain a flash heating zone across the seam between said edges, maintaining the flash heating zone in space during the movement of the tube along its longitudinal axis, and bringing said seam edges into direct pressure engagement to produce and consolidate the weld.

33. In the continuous method of electric induction welding, the steps comprising moving an open seam metal tube along its longitudinal axis to bring successive portions thereof into an inducing zone, effecting in said zone a periodically varying current flow adjacent to but spaced from a surface of said tube and inducing thereby a cross seam current flow in the tube, bringing the seam edges of the tube into closer and closer proximity until said induced current is able to maintain a flash heating zone across the seam between said edges, maintaining the flash heating zone in space during the movement of the tube along its longitudinal axis, then bringing said seam edges into intimate metallic contact while maintaining an induced heating current flow thereacross, and bringing said seam edges into direct pressure engagement to produce and consolidate the weld.

34. In the method of continuously welding open seam metal tubes by induction, the steps comprising longitudinally progressively advancing an open seam metal tube, bringing the seam edges of said tube into closer and closer proximity during the longitudinal movement thereof until said edges are sufficiently close to provide a flash heating zone, inducing in the metal in said zone a cross seam current flow for maintaining a flash between said edges for heating the seam, and maintaining said flash heating zone in point of space by induction during the longitudinal travel of the tube.

35. In the method of continuously welding open seam metal tubes by induction, the steps comprising longitudinally progressively advancing an open seam metal tube, bringing the seam edges of said tube into closer and closer proximity during the longitudinal movement thereof until said edges are sufficiently close to provide a flash heating zone, inducing in the metal in said zone a cross seam current flow for maintaining a flash between said edges for heating the seam, maintaining said flash heating zone in point of space by induction during the longitudinal travel of the tube, and controlling the rate of progressive advance of said tube to the current induced therein to insure heating of the edge portions to a welding temperature during such movement.

36. In the continuous method of electric induction welding, the steps comprising longitudinally advancing an open seam metal tube, progressively bringing the seam edges of the tube into closer and closer proximity until progressive edge portions are brought within electric flashing distance, inducing a cross seam current flow in the tube to produce a flash between the edge portions within flashing distance, progressively bringing the previously spaced edge portions into close metallic contact while maintaining a cross seam induced current in the tube, and applying pressure to progressive tube portions to consolidate the weld.

37. In the continuous method of electric induction welding, the steps comprising causing progressive portions of the open seam edges to successively approach one another, inducing a cross seam heating current across said edges before the same come into actual physical contact for producing a flash therebetween for heating the seam edges, progressively bringing said heated seam edges into intimate metallic contact, continuously inducing a cross seam current flow between the contacting seam edges to effect resistance heating thereof, and thereafter applying pressure transversely of the plane of the seam edges to consolidate the weld.

38. In a machine for making welded seamless pipe, conduit and the like, in combination with a power driven roll stand for feeding open seam pipe or conduit, an idle roll stand through which said pipe is fed, means for heating the open seam of said pipe or conduit by electromagnetic induction to welding or fusing temperature as it leaves the idle roll stand, and a power driven roll stand through which the pipe passes for rolling and crushing the heated seam to complete the welding operation.

39. The method of welding a longitudinal seam in a metal sheet to form a pipe, which consists in maintaining the seam open for a portion of the length of the pipe, in progressing the pipe longitudinally, in inducing current flow about the pipe in its open portion from within the pipe, in bringing the edges into contact to cause concentration there of flow of induced current and in pressing the edges together where the current flow is concentrated to weld the pipe.

40. The method of welding a longitudinal seam in a metal sheet to form a pipe, which consists in maintaining the seam open for a portion of the length of the pipe, in progressing the pipe longitudinally, in inducing current flow about the pipe in its open portion from within and without the pipe, in bringing the edges into contact to cause concentration there of flow of induced current and in pressing the edges together where the current flow is concentrated to weld the pipe.

41. In a method of electrically welding metallic plate edges, the steps including moving said edges in the direction of their length, maintaining the edges in spaced relation, subjecting the moving, spaced edges to an alternating magnetic field of sufficient intensity to induce an electric current traversing said edges and the gap therebetween substantially at right angles thereto, and subsequently forcing the edges together to form a welded seam.

42. Apparatus for welding moving, metallic plate edges including means for longitudinally advancing said edges, means for maintaining said edges in very narrow spaced relation, means for inducing a current traversing said edges and the gap therebetween and substantially at right angles thereto, and means for forcing said edges together to effect a weld.

43. Apparatus for welding moving, metallic plate edges including means for longitudinally advancing said edges, said means being effective for initially causing abutting engagement of the edges but ineffective to prevent subsequent separation of the edges, means for maintaining said edges in spaced relation, means for inducing a current traversing said edges and the gap therebetween and substantially at right angles thereto, and means for forcing said edges together to effect a weld.

44. In a method of welding metallic plate edges, the steps including moving the edges in the direction of their length, initially maintaining the edges in spaced relation and causing gradual converging movement thereof into abutting engagement, subjecting the portion of the edges which are in spaced relation to a magnetic field of sufficient intensity to induce a current traversing said edges and the gap therebetween substantially at right angles thereto, and subjecting the portions of the edges which are in abutting engagement to a magnetic field sufficient to induce a further current traversing said edges and the seam therebetween at substantially right angles thereto.

45. In a method of heating blank edges prior to working, the steps including moving the edges into abutting contact, separating the edges, subjecting the spaced edges to a periodically varying electromagnetic field of sufficient intensity to cause a current to traverse said edges and the cleft therebetween.

46. Means for progressively heating opposed, metallic plate edges comprising means for advancing said edges in spaced relation, means for inducing a current traversing said edges and the cleft therebetween substantially at right angles thereto, and means for progressively controlling the spacing of the edges to maintain said current flow across the cleft as the edges are heated and burned away.

47. In a method of welding longitudinally moving, spaced, metallic edges, the steps including subjecting the edges to a periodically varying magnetic field of sufficient intensity to cause a current to traverse the edges and the cleft therebetween substantially at right angles thereto, causing the convergence of said edges to an extent sufficient to maintain current flow across the cleft as the edges burn away, and finally pressing the edges together to effect a weld.

48. In a method of welding moving plate edges, the steps including maintaining said edges in spaced relation, supplying a heating current traversing said edges and the cleft therebetween substantially at right angles thereto, advancing said edges along the direction of their length, while maintaining the zone of current flow substantially fixed in space, and forcing the edges together when heated sufficiently for welding.

49. In a method of heating moving, metallic edges, the steps including maintaining said edges in narrowly spaced and slowly converging relation, inducing a current traversing said edges and the space therebetween, pressing the edges together when heated sufficiently for welding, and so guiding the converging edges prior to the welding thereof as to maintain the flow of heating current across the gap between the moving edges up to a point closely adjacent to the actual welding.

50. In a method of heating moving, metallic edges, the steps including maintaining said edges in narrowly spaced and slowly converging relation, inducing a current traversing said edges and the space therebetween, pressing the edges together when heated sufficiently for welding, so guiding the converging edges prior to the welding thereof as to maintain the flow of heating current across the gap between the moving edges up to a point closely adjacent to the actual welding, and maintaining the flow of current traversing said edges after they are in actual contact.

51. In a welding apparatus, means for longitudinally advancing metallic edges in slightly spaced and slowly converging relation, means for causing a heating current to traverse said edges and the cleft therebetween, means for forcing the heated edges together to form a weld, and means for so controlling the convergence of the edges as to maintain the flow of current across the cleft to a point adjacent the edge-pressing means.

52. In a method of flash welding plate edges initially but slightly separated, the steps including inducing a voltage between said edges sufficient to maintain a flash current therebetween, maintaining said flash current over a considerable portion of the length of the seam between said edges, forcing said edges into contact under welding pressure, and subjecting the heated edges while still in spaced relation to a magnetic field to eject excess metal from the seam.

53. The method of electric welding which comprises inducing current flow across the members to be welded, from a given source, supplementing said induced current flow from another source, effecting traveling movement of the material relative to said sources, and varying the positions of said sources relative to one another, in directions longitudinally of the line of weld, to vary the intensity of the induced current at a given point along the line of weld.

54. Welding apparatus comprising a pair of induction coils axially-spaced apart to permit movement between the same of members to be welded, the said coils being mounted for relative adjustment in directions parallel to the line of weld.

55. A machine for longitudinally welding an initially open pipe blank comprising, in combination, a frame, electro-inductive means for inducing current into the pipe blank to perform the welding operation, support means for mounting the electro-inductive means within the pipe blank, the support means being carried by the frame and positioned in the longitudinal opening in the pipe blank whereby the location of the opening is maintained in a predetermined position, and pinch and guide rolls mounted on the frame respectively at the trailing and leading end for supporting and moving the pipe blank.

56. A machine for longitudinally welding an initially open pipe blank comprising, in combination, a frame, a core and an energizing coil thereon for inducing current into the pipe blank to perform the welding operation, support means for mounting the core and coil within the pipe blank, the support means being carried by the frame and positioned in the longitudinal opening in the pipe blank whereby the location of the opening is maintained in a predetermined position, and pinch and guide rolls mounted on the frame respectively at the trailing and leading end for supporting and moving the pipe blank.

57. In a method of electric induction welding, the steps comprising continuously moving a substantially tubular body to be welded, and controlling said body during movement to provide a zone of longitudinal edge to edge contact, a heating zone of slight separation, and a final heating zone of intimate metallic contact in which the weld is effected.

58. In the method of welding, the steps comprising inductively supplying heating current to a portion of the total length of the material being welded, moving the material while inductively supplying heating current thereto, and controlling the material to provide an initial zone in which the edges of the material are in contact, a second zone in which the edges are out of contact, and a final zone in which the edges are in contact, and adjusting the control to maintain at least part of each of said two last-mentioned zones within the limits of that portion of the material in which a heating current flow is being induced.

JAMES L. ADAMS, Jr.